(12) United States Patent
Propheter-Hinckley et al.

(10) Patent No.: US 9,976,743 B2
(45) Date of Patent: May 22, 2018

(54) DILUTION HOLE ASSEMBLY

(71) Applicant: United Technologies Corporation, Hartford, CT (US)

(72) Inventors: Tracy A. Propheter-Hinckley, Manchester, CT (US); Dominic J. Mongillo, Jr., West Hartford, CT (US); Stanislav Kostka, Jr., Shrewbury, MA (US)

(73) Assignee: United Technologies Corporation, Farmington, CT (US)

( * ) Notice: Subject to any disclaimer, the term of this patent is extended or adjusted under 35 U.S.C. 154(b) by 276 days.

(21) Appl. No.: 14/789,557

(22) Filed: Jul. 1, 2015

(65) Prior Publication Data

US 2016/0003478 A1 Jan. 7, 2016

Related U.S. Application Data

(60) Provisional application No. 62/020,664, filed on Jul. 3, 2014.

(51) Int. Cl.
*F23R 3/14* (2006.01)
*F23R 3/06* (2006.01)
*F23R 3/00* (2006.01)

(52) U.S. Cl.
CPC ............... *F23R 3/14* (2013.01); *F23R 3/002* (2013.01); *F23R 3/06* (2013.01); *F23R 2900/03044* (2013.01); *Y02T 50/675* (2013.01)

(58) Field of Classification Search
CPC .... F23R 3/002; F23R 3/02; F23R 3/04; F23R 3/06; F23R 3/10; F23R 3/12; F23R 3/14; F23R 3/34; F23R 2900/03041–2900/03045
See application file for complete search history.

(56) References Cited

U.S. PATENT DOCUMENTS

| | | | | |
|---|---|---|---|---|
| 2,916,878 A | * | 12/1959 | Wirt | F23R 3/04 60/39.281 |
| 3,872,664 A | * | 3/1975 | Lohmann | F23R 3/14 431/9 |
| 4,790,140 A | * | 12/1988 | Sato | F23R 3/002 60/757 |
| 5,165,241 A | * | 11/1992 | Joshi | F23R 3/14 60/737 |
| 5,406,799 A | * | 4/1995 | Marshall | F23R 3/34 60/747 |

(Continued)

FOREIGN PATENT DOCUMENTS

| | | |
|---|---|---|
| GB | 2017827 A | 10/1979 |
| WO | 2015108583 | 7/2015 |

OTHER PUBLICATIONS

EP search report for EP15175179 dated Jan. 4, 2016.
EP search report for EP17184965.6 dated Mar. 21, 2018.

*Primary Examiner* — Gerald L Sung
*Assistant Examiner* — Alain Chau
(74) *Attorney, Agent, or Firm* — O'Shea Getz P.C.

(57) ABSTRACT

A dilution hole assembly is provided for a combustor. The dilution hole assembly includes a first wall and at least one outer vane. The first wall extends continuously about a centerline and defines a radially inward hole. The at least one outer vane projects radially inward from the first wall for swirling at least a portion of air flowing through the hole.

19 Claims, 3 Drawing Sheets

(56) References Cited

U.S. PATENT DOCUMENTS

| | | | |
|---|---|---|---|
| 5,490,380 A * | 2/1996 | Marshall | F23R 3/50 60/733 |
| 5,865,024 A * | 2/1999 | Kress | F23D 14/62 60/39.463 |
| 6,141,967 A * | 11/2000 | Angel | F23R 3/286 239/405 |
| 6,715,292 B1 | 4/2004 | Hoke | |
| 7,007,864 B2 | 3/2006 | Snyder et al. | |
| 8,689,563 B2 | 4/2014 | Low | |
| 8,733,078 B2 | 5/2014 | Alholm | |
| 8,973,368 B2 | 3/2015 | Dai et al. | |
| 9,068,751 B2 | 6/2015 | Snyder | |
| 9,115,897 B2 | 8/2015 | Snyder et al. | |
| 2002/0189260 A1 | 12/2002 | David et al. | |
| 2009/0200275 A1 | 8/2009 | Twelves, Jr. et al. | |
| 2010/0223930 A1 * | 9/2010 | Chila | F23R 3/04 60/752 |
| 2010/0242483 A1 | 9/2010 | Snyder et al. | |
| 2013/0025288 A1 | 1/2013 | Cunha et al. | |
| 2014/0182292 A1 | 7/2014 | Hudon et al. | |
| 2015/0003997 A1 | 1/2015 | Mironets et al. | |

* cited by examiner

DILUTION HOLE ASSEMBLY

This application claims priority to U.S. patent application Ser. No. 62/020,664 filed Jul. 3, 2014.

BACKGROUND

The present disclosure relates to a dilution hole assembly and, more particularly, to a dilution hole assembly for a combustor of a gas turbine engine.

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases and thereby generate thrust.

The combustor section typically includes a wall assembly having an outer shell lined with heat shields that are often referred to as floatwall panels. Together, the panels define a combustion chamber. A plurality of dilution holes are generally spaced circumferentially about the wall assembly and flow dilution air from a cooling plenum and into the combustion chamber to improve emissions, and reduce and control the temperature profile of combustion gases at the combustor outlet to protect the turbine section from overheating.

The dilution holes are generally defined by a grommet that extends between the heat shield panel and supporting shell with a cooling cavity defined therebetween. Improvements to the functionality of dilution holes is desirable.

SUMMARY

A dilution hole assembly according to a, non-limiting, embodiment of the present disclosure includes a first wall extending continuously about a centerline and defining a radially inward hole; and at least one outer vane projecting radially inward from the first wall for swirling at least a portion of air flowing through the hole.

Additionally to the foregoing embodiment, the assembly includes a second wall extending continuously about the centerline and spaced radially inward from the first wall, wherein a first portion of the hole contains the at least one outer vane with each outer vane extending radially between and engaged to the first and second walls.

In the alternative or additionally thereto, in the foregoing embodiment, the assembly includes at least one inner vane projecting radially inward from the second wall, and spaced circumferentially about the centerline.

In the alternative or additionally thereto, in the foregoing embodiment, the at least one inner vane and the at least one outer vane are in counter swirling relationship to one-another.

In the alternative or additionally thereto, in the foregoing embodiment, the assembly includes a third wall extending continuously about the centerline and spaced radially inward from the second wall, wherein a second portion of the hole, radially inward of the first portion and radially inward of and bounded by the second wall contains the at least one inner vane with each inner vane extending radially between the second and third walls.

In the alternative or additionally thereto, in the foregoing embodiment, the hole includes a third portion radially inward of and bounded by the third wall and configured for flowing air generally parallel to the centerline.

In the alternative or additionally thereto, in the foregoing embodiment, the third wall is generally conical for impinging air that flows through the second portion against air that flows through the first portion.

In the alternative or additionally thereto, in the foregoing embodiment, a second portion of the hole is radially inward of and bounded by the second wall, and the second wall is generally conical for impinging air that flows through the first portion against air that flows through the second portion of the hole radially inward of the second wall.

In the alternative or additionally thereto, in the foregoing embodiment, a respective outer vane has an air jet passage having an inlet communicating through the first wall and an outlet communicating through the respective outer vane and in direct fluid communication with the hole for creating air turbulence.

In the alternative or additionally thereto, in the foregoing embodiment, the outlet is carried by a suction side of the respective outer vane.

A combustor according to another, non-limiting, embodiment includes a liner disposed about an axis and defining a combustion chamber; a shell radially outward of the liner, wherein a cooling cavity is defined the liner and the shell and an air plenum is radially outward of the shell; and a dilution hole assembly having an outer wall contacting the liner and the shell and defining a hole in fluid communication with the air plenum and the combustion chamber, and a second wall located in the hole, wherein an annular outer portion of the hole is defined by and between the outer and second walls and a second portion of the hole is defined at least in-part by and inward of the second wall.

Additionally to the foregoing embodiment, the outer wall isolates the cooling cavity from the hole.

In the alternative or additionally thereto, in the foregoing embodiment, the hole has a centerline and the second wall has an inner face defining at least in-part the inner portion and sloped radially outward with respect to the centerline and in the direction of air flow from the air plenum and into the combustion chamber.

In the alternative or additionally thereto, in the foregoing embodiment, the dilution hole assembly has a plurality of outer vanes in the annular outer portion and spaced circumferentially from one-another with respect to a centerline of the hole for swirling air flow through the annular outer portion.

In the alternative or additionally thereto, in the foregoing embodiment, the dilution hole assembly has a plurality of inner vanes in the inner portion and spaced circumferentially from one-another with respect to a centerline of the hole for swirling at least a portion of air flowing through the inner portion.

In the alternative or additionally thereto, in the foregoing embodiment, the dilution hole assembly has a plurality of outer vanes in the annular outer portion and spaced circumferentially from one-another with respect to a centerline of the hole for swirling air flowing through the annular outer portion, and a plurality of inner vanes in the inner portion and spaced circumferentially from one-another with respect to the centerline for swirling at least a portion of air flowing through the inner portion in a counter direction from the air flowing through the annular outer portion.

In the alternative or additionally thereto, in the foregoing embodiment, the dilution hole assembly has an inner wall located radially inward of the second wall with respect to the centerline and the inner portion is an annular inner portion.

In the alternative or additionally thereto, in the foregoing embodiment, the inner wall defines a jet stream portion of the hole located radially inward of the annular inner portion with respect to the centerline.

A dilution hole assembly for a combustor of a gas turbine engine according to another, non-limiting, embodiment includes a first wall defining a boundary of a first portion of a dilution hole for flowing a first airstream; and a second wall defining a boundary of a second portion of the dilution hole for flowing a second airstream.

Additionally to the foregoing embodiment, the second portion is annular and is bounded radially between the first and second walls and the first portion is radially inward of the second portion and the first wall.

The foregoing features and elements may be combined in various combination without exclusivity, unless expressly indicated otherwise. These features and elements as well as the operation thereof will become more apparent in light of the following description and the accompanying drawings. It should be understood, however, the following description and figures are intended to exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
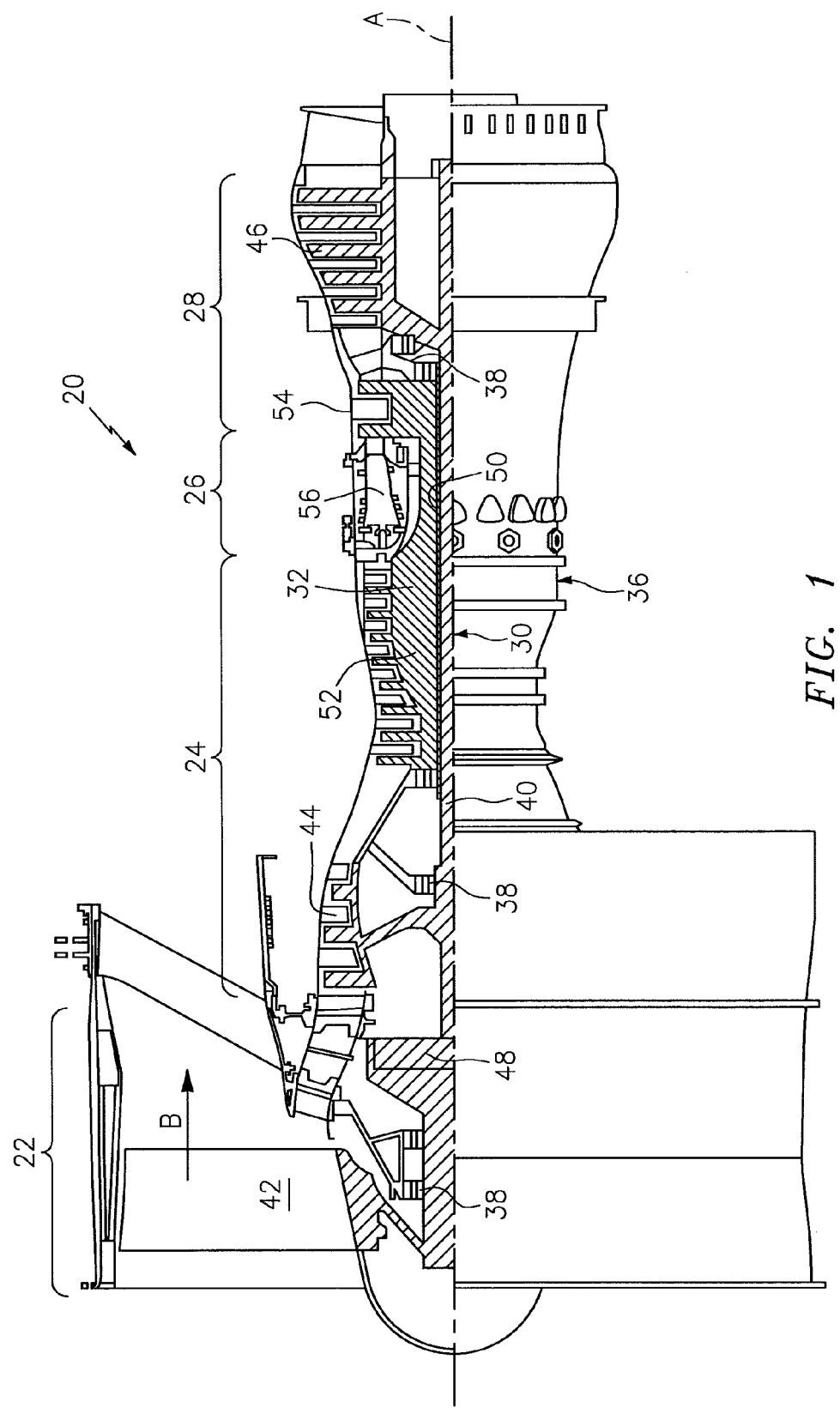
FIG. 1 is a schematic cross-section of a gas turbine engine.

FIG. 1 schematically illustrates a gas turbine engine 20 disclosed as a two-spool turbo fan that generally incorporates a fan section 22, a compressor section 24, a combustor section 26 and a turbine section 28. Alternative engines may include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architecture such as turbojets, turboshafts, and three-spool turbofans with an intermediate spool.

The engine 20 generally includes a low spool 30 and a high spool 32 mounted for rotation about an engine axis A via several bearing structures 38 and relative to a static engine case 36. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") of the compressor section 24 and a high pressure turbine 54 ("HPT") of the turbine section 28. A combustor 56 of the combustor section 26 is arranged between the HPC 52 and the HPT 54. The inner shaft 40 and the outer shaft 50 are concentric and rotate about the engine axis A. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting example, the bypass ratio of the gas turbine engine 20 is greater than about ten (10:1); the fan diameter is significantly larger than the LPC 44; and the LPT 46 has a pressure ratio that is greater than about five (5:1). It should be understood; however, that the above parameters are only exemplary of one example of a geared architecture engine and that the present disclosure is applicable to other gas turbine engines including direct drive turbofans.

In one non-limiting example, a significant amount of thrust is provided by the bypass flow path B due to the high bypass ratio. The fan section 22 of the gas turbine engine 20 is designed for a particular flight condition—typically cruise at about 0.8 Mach and about 35,000 feet (10,668 meters). This flight condition, with the gas turbine engine 20 at its best fuel consumption, is also known as bucket cruise Thrust Specific Fuel consumption (TSFC). TSFC is an industry standard parameter of fuel consumption per unit of thrust.

Fan Pressure Ratio is the pressure ratio across a blade of the fan section 22 without the use of a fan exit guide vane system. The low Fan Pressure Ratio according to one non-limiting example of the gas turbine engine 20 is less than 1.45:1. Low Corrected Fan Tip Speed is the actual fan tip speed divided by an industry standard temperature correction of $(T/518.7^{0.5})$, where "T" represents the ambient temperature in degrees Rankine. The Low Corrected Fan Tip Speed according to one non-limiting example of the gas turbine engine 20 is less than about 1,150 feet per second (351 meters per second).

Figure 2:
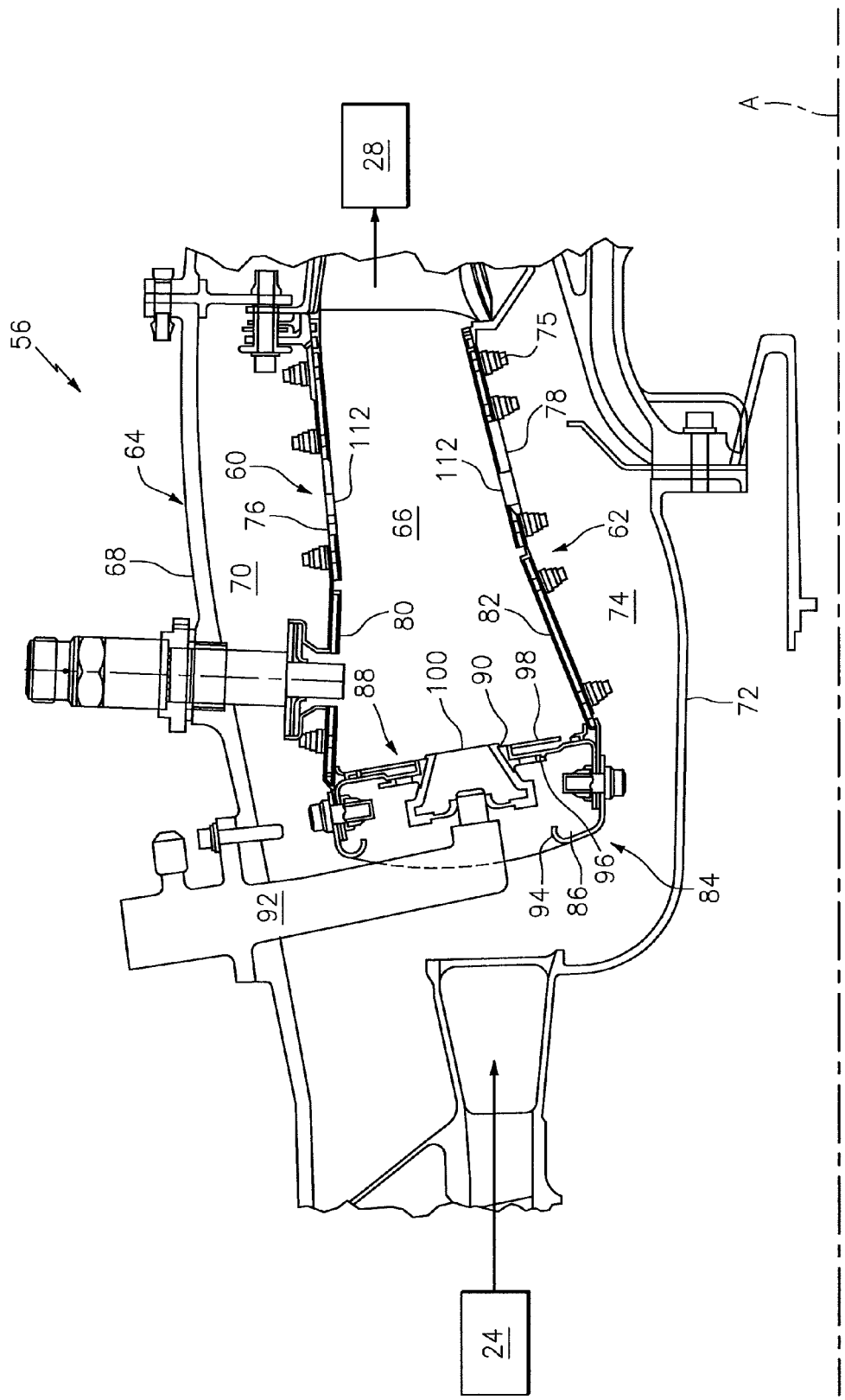
FIG. 2 is a cross-section of a combustor section.

Referring to FIG. 2, the combustor section 26 generally includes an annular combustor 56 with an outer combustor wall assembly 60, an inner combustor wall assembly 62, and a diffuser case module 64 that surrounds assemblies 60, 62. The outer and inner combustor wall assemblies 60, 62 are generally cylindrical and radially spaced apart such that an annular combustion chamber 66 is defined therebetween. The outer combustor wall assembly 60 is spaced radially inward from an outer diffuser case 68 of the diffuser case module 64 to define an outer annular plenum 70. The inner wall assembly 62 is spaced radially outward from an inner diffuser case 72 of the diffuser case module 64 to define, in-part, an inner annular plenum 74. Although a particular combustor is illustrated, it should be understood that other combustor types with various combustor liner arrangements will also benefit. It is further understood that the disclosed cooling flow paths are but an illustrated embodiment and should not be so limited.

The combustion chamber 66 contains the combustion products that flow axially toward the turbine section 28. Each combustor wall assembly 60, 62 generally includes a respective support shell 76, 78 that supports one or more heat shields or liners 80, 82. Each of the liners 80, 82 may be formed of a plurality of floating panels that are generally rectilinear and manufactured of, for example, a nickel based super alloy that may be coated with a ceramic or other temperature resistant material, and are arranged to form a liner configuration mounted to the respective shells 76, 78.

The combustor 56 further includes a forward assembly 84 that receives compressed airflow from the compressor section 24 located immediately upstream. The forward assembly 84 generally includes an annular hood 86, a bulkhead assembly 88, and a plurality of swirlers 90 (one shown). Each of the swirlers 90 are circumferentially aligned with one of a plurality of fuel nozzles 92 (one shown) and a respective hood port 94 to project through the bulkhead assembly 88. The bulkhead assembly 88 includes a bulkhead support shell 96 secured to the combustor wall assemblies 60, 62 and a plurality of circumferentially distributed bulkhead heat shields or panels 98 secured to the bulkhead support shell 96 around each respective swirler 90 opening. The bulkhead support shell 96 is generally annular and the plurality of circumferentially distributed bulkhead panels 98 are segmented, typically one to each fuel nozzle 92 and swirler 90.

The annular hood 86 extends radially between, and is secured to, the forwardmost ends of the combustor wall assemblies 60, 62. Each one of the plurality of circumferentially distributed hood ports 94 receives a respective on the plurality of fuel nozzles 92, and facilitates the direction of compressed air into the forward end of the combustion chamber 66 through a swirler opening 100. Each fuel nozzle 92 may be secured to the diffuser case module 64 and projects through one of the hood ports 94 into the respective swirler 90.

The forward assembly 84 introduces core combustion air into the forward section of the combustion chamber 66 while the remainder of compressor air enters the outer annular plenum 70 and the inner annular plenum 74. The plurality of fuel nozzles 92 and adjacent structure generate a blended fuel-air mixture that supports stable combustion in the combustion chamber 66.

Figure 3:
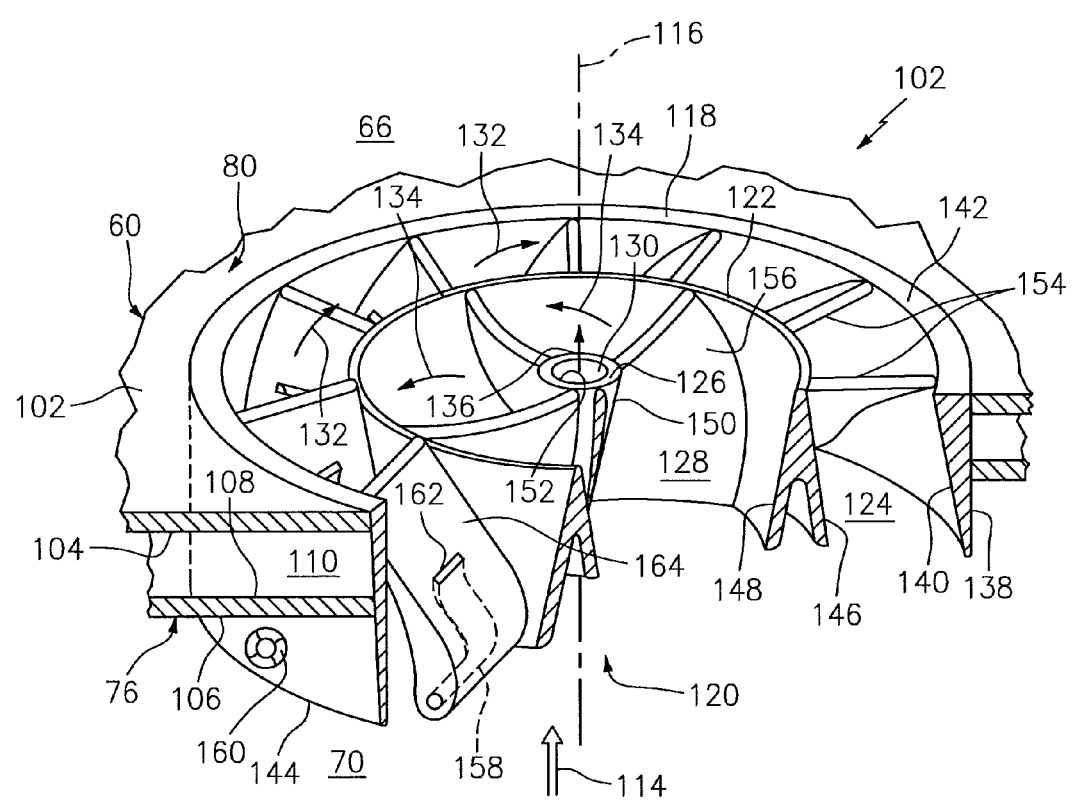
FIG. 3 is a perspective cross section of a dilution hole assembly according to one, non-limiting, example of the present disclosure.

Referring to FIG. 3, the heat resistant panel 80 of wall assembly 60 (which may include an array of panels) includes a hot side 102 that generally defines in-part a boundary of the combustion chamber 66 and an opposite cold side 104. The shell 76 includes an outer side 106 that faces and defines in-part a boundary of the cooling plenum 70 and an opposite inner side 108 that faces and is spaced from the cold side 104 of the heat shield 80. An annular cooling cavity 110 is located between and defined by the cold side 104 of the heat shield 80 and the inner side 108 of the shell 76.

A dilution hole assembly 112 is illustrated and described in relation to the outer wall assembly 60 for simplicity of explanation; however, it is understood that the same dilution hole assembly may be applied to the inner wall assembly 62 of the combustor 56. The dilution hole assembly 112 generally functions to flow dilution air (see arrow 114) from the cooling plenum 70, through the wall assembly 60, via the dilution hole assembly 112, and into the combustion chamber 66. This dilution air may generally enter the combustion chamber 66 as a jet stream with a turbulent flowing periphery to improve combustion efficiency throughout the chamber and further serves to cool and/or control the temperature profile of combustion gases at the exit of the combustor 56.

The dilution hole assembly 112 may include a centerline 116, an outer wall 118 extending continuously about the centerline 116, a dilution hole 120 located inward of and defined by the outer wall 118, a second wall 122 located in the dilution hole 120 and spaced radially inward of the outer wall 118, an annular outer portion 124 of the dilution hole 120 defined by and between the outer and second walls 118, 122, a third or inner wall 126 spaced radially inward of the second wall 122, an annular second or mid portion 128 of the dilution hole 120 defined by and located between the second and third walls 122, 126, and a jet stream portion 130 of the dilution hole 120 defined by and located radially inward of the third wall 126. The flow of dilution air 114 is generally divided into three portions or airstreams with each airstream flowing through the respective annular outer portion 124, the annular mid portion 128 and the jet stream portion 130. The direction of air flow may be different for each airstream of air 114 (see arrows 132, 134 and 136) and orientated so that at least the outer airstream 132 and the mid airstream 134 generally impinge upon one-another or otherwise create turbulence for enhanced mixing with combustion gases. The third or inner airstream 136 may behave as a jet stream for maximum penetration into the core region of the combustion chamber 66.

The outer wall 118 has a first face 138 that generally faces radially outward and a substantially opposite face 140 that defines in-part the annular outer portion 124 of the hole 120. The outward face 138 is generally in contact with the shell 76 and the liner 80 and a portion thereof may define, in-part, the cooling cavity 110 such that the outer wall 118 substantially segregates the cavity 110 from the dilution hole 120. Contact of the outward face 138 with the liner 80 may be an 'engagement' such that the liner and the outer wall 118 are one unitary part. The contact of the outward face 138 (or a face extending therefrom) may be a sealing contact with the shell 76. A first end portion 142 of the outer wall 118 may be substantially flush with the hot side 102 of the liner 80 and an opposite end portion 144 of the outer wall 118 may project beyond the shell 76 and into the plenum 70. To promote impingement and/or mixing of airstreams 132, 134, the inward face 140 may be sloped radially inward as the face spans axially in a downstream direction with respect to the centerline 116 (i.e. direction of airstream 136).

The second or mid wall 122 has a first face 146 that generally faces radially outward and a substantially opposite face 148 that defines in-part the annular mid portion 128 of the dilution hole 120. To promote impingement and/or mixing of airstreams 132, 134, the outward face 146 may be sloped radially inward as the face 146 spans axially in a downstream direction. Similarly, and to promote impingement, the inward face 148 may be sloped radially outward as the face 148 spans axially in the downstream direction. With both faces 146, 148 sloped, the mid wall 122 may have a triangular shaped cross section and/or when viewing the faces individually, they are each cone or frustum-like in appearance. The mid wall 122 may be generally hollowed-out to reduce weight.

The inner wall 126 has a first face 150 that generally faces radially outward and may have a substantially opposite face 152 that defines the inner portion 130 of the dilution hole 120. To promote impingement and/or mixing of airstreams 132, 134, the outward face 150 may be sloped radially outward as the face 150 spans axially in a downstream direction. The inward face 152 may be substantially cylindrical or otherwise sloped to adjust for the needed penetration of the airstream 136 into the core region of the combustion chamber 66. The inner wall 126 or outward face 150 may be cone or frustum-like in appearance.

To further enhance impingement and/or mixing of airstreams 132, 134 the dilution hole assembly 112 may include a plurality of outer vanes 154 in the annular outer portion 124 and a plurality of inner vanes 156 in the annular inner portion 128 of the dilution hole 120. The plurality of vanes 154, 156 create a circumferential swirling action of the respective airstreams 132, 134 and in counter circumferential directions. Each vane of the plurality of outer vanes 154 are spaced circumferentially from the next adjacent vane and extend radially between and may be engaged to the inward face 140 of the outer wall 118 and the outward face 146 of the mid wall 122. Similarly, each vane of the plurality of inner vanes 156 are spaced circumferentially from the next adjacent vane and extend radially between and may be engaged to the inward face 148 of the mid wall 122 and the outward face 150 of the inner wall 126.

Each vane of the plurality of outer vanes 154 may further include an air jet passage 158 having an inlet 160 communicating through the end portion 144 of the outer wall 118 and an outlet 162 that may communicate through a suction side 164 of the vane 154. Air may thus flow from the plenum 70, through the passage 158 and into the outer portion 124 of the dilution hole 120 for creating turbulence within the airstream 132 for enhanced mixing of dilution air 114 with combustion gases. Although not illustrated, it is further contemplated and understood that similar air jet passages may be in the inner vanes 156.

It is understood that various combinations and/or omissions of the above described features may be incorporated. For instance, one or all of the walls 118, 122, 126 may not be sloped and the vanes 154, 156 may be used solely for mixing of dilution air. Alternatively, there may be no vanes, and the sloping of walls 118, 122, 126 may be used solely to mix or create turbulence within and about the dilution air streams. Yet further, the mid wall 122 and the vanes 156 may be omitted altogether such that the dilution air 114 has only two streams, or more walls may be added to further divide the dilution air.

Because applications of the dilution hole assembly 112 (e.g. combustor dilution holes) may be relatively small, manufacturing of the structure may be accomplished through additive manufacturing. Through additive manufacturing, the structure 116 may be formed as one unitary part. Individual features may be as small as about 0.010 inches (0.254 millimeters) in thickness or diameter while being generally non-porous, and various holes may be generally as small as 0.012 inches (0.305 millimeters) in diameter and/or as dictated by the filtering of any undesired particulate within surrounding airstreams. It is further understood and contemplated that minimal dimensions may be reduced with continued improvements in additive manufacturing processes.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A dilution hole assembly positioned on a combustion liner disposed about an axis and forming a combustion chamber, the dilution hole assembly comprising:
   a first wall extending continuously about a centerline and defining a radially inward hole for providing cooling dilution air flow radially into the combustion chamber with respect to the axis, the hole disposed downstream of a forwardmost end of the combustion chamber; and
   at least one outer vane projecting radially inward from the first wall with respect to the centerline for swirling at least a portion of air flowing through the hole;
   a second wall extending continuously about the centerline and spaced radially inward from the first wall, wherein a first portion of the hole contains the at least one outer vane with each outer vane extending radially between and engaged to the first and the second walls; and
   at least one inner vane projecting radially inward from the second wall, and spaced circumferentially about the centerline.

2. The dilution hole assembly set forth in claim 1, the at least one inner vane and the at least one outer vane are in counter swirling relationship to one-another.

3. The dilution hole assembly set forth in claim 2 further comprising:
   a third wall extending continuously about the centerline and spaced radially inward from the second wall, wherein a second portion of the hole, radially inward of the first portion and radially inward of and bounded by the second wall contains the at least one inner vane with each inner vane extending radially between the second and third walls.

4. The dilution hole assembly set forth in claim 3, wherein the hole includes a third portion radially inward of and bounded by the third wall and configured for flowing air generally parallel to the centerline.

5. The dilution hole assembly set forth in claim 3, wherein the third wall is generally conical for impinging air that flows through the second portion against air that flows through the first portion.

6. The dilution hole assembly set forth in claim 1, wherein a second portion of the hole is radially inward of and bounded by the second wall, and the second wall is generally conical for impinging air that flows through the first portion against air that flows through the second portion of the hole radially inward of the second wall.

7. The dilution hole assembly set forth in claim 1, wherein a respective outer vane has an air jet passage having an inlet communicating through the first wall and an outlet communicating through the respective outer vane and in direct fluid communication with the hole for creating air turbulence.

8. The dilution hole assembly set forth in claim 7, wherein the outlet is carried by a suction side of the respective outer vane.

9. The dilution hole assembly of claim 1, wherein a cross-sectional area of an inner portion of the hole formed within and by the second wall increases as the inner portion extends along the centerline from an upstream end of the second wall to a downstream end of the second wall.

10. The dilution hole assembly of claim 9, wherein a cross-sectional area of the first portion decreases as the first portion extends along the centerline from the upstream end of the second wall to the downstream end of the second wall.

11. A combustor comprising:
a forwardmost end that includes a fuel nozzle;
a liner disposed about an axis and defining a combustion chamber that is downstream of the forwardmost end;
a shell radially outward of the liner, wherein a cooling cavity is defined by the liner and the shell and an air plenum is radially outward of the shell; and
a dilution hole assembly having an outer wall extending about a centerline and contacting the liner and the shell and defining a hole in fluid communication with the air plenum and the combustion chamber, said hole providing cooling dilution air flow radially through the liner and shell into the combustion chamber downstream of the forwardmost end, and a second wall located in the hole about the centerline, wherein an annular outer portion of the hole is defined by and between the outer wall and the second wall, and an inner portion of the hole is defined at least in-part by and inward of the second wall with respect to the centerline;
wherein the dilution hole assembly has a plurality of inner vanes in the inner portion and spaced circumferentially from one-another with respect to the centerline for swirling at least a portion of air flowing through the inner portion.

12. The combustor set forth in claim 11, wherein the outer wall isolates the cooling cavity from the hole.

13. The combustor set forth in claim 11, wherein the dilution hole assembly further has a plurality of outer vanes in the annular outer portion and spaced circumferentially from one-another with respect to the centerline of the hole for swirling air flowing through the annular outer portion, and the inner vanes in the inner portion are adapted for swirling the at least a portion of air flowing through the inner portion in a counter direction from the air flowing through the annular outer portion.

14. The combustor set forth in claim 13, wherein the dilution hole assembly has an inner wall located radially inward of the second wall with respect to the centerline, each of the inner vanes extends between and is connected to the second wall and the inner wall, and the inner portion is an annular inner portion.

15. The combustor set forth in claim 14, wherein the inner wall defines a jet stream portion of the hole located radially inward of the annular inner portion with respect to the centerline.

16. A combustor comprising:
a forwardmost end that includes a fuel nozzle;
a liner disposed about an axis and defining a combustion chamber that is downstream of the forwardmost end;
a shell radially outward of the liner, wherein a cooling cavity is defined by the liner and the shell and an air plenum is radially outward of the shell; and
a dilution hole assembly having an outer wall extending about a centerline and contacting the liner and the shell and defining a hole in fluid communication with the air plenum and the combustion chamber, said hole providing cooling dilution air flow radially through the liner and shell into the combustion chamber downstream of the forwardmost end, and a second wall located in the hole, wherein an annular outer portion of the hole is defined by and between the outer wall and the second wall and an inner portion of the hole is defined at least in-part by and inward of the second wall with respect to the centerline;
wherein the second wall has an inner face defining at least in-part the inner portion, and the inner face is sloped radially outward with respect to the centerline and in the direction of air flow from the air plenum and into the combustion chamber as the inner face extends axially along the centerline between opposing ends of the second wall; and
wherein the dilution hole assembly has a plurality of inner vanes in the inner portion and spaced circumferentially from one-another with respect to the centerline of the hole for swirling at least a portion of air flowing through the inner portion.

17. The combustor set forth in claim 16, wherein the dilution hole assembly has a plurality of outer vanes in the annular outer portion and spaced circumferentially from one-another with respect to the centerline of the hole for swirling air flow through the annular outer portion.

18. The combustor of claim 16, wherein a cross-sectional area of the inner portion increases as the inner portion extends, in the direction of air flow from the air plenum and into the combustion chamber, between the opposing ends of the second wall.

19. The combustor of claim 18, wherein a cross-sectional area of the annular outer portion decreases as the annular outer portion extends, in the direction of air flow from the air plenum and into the combustion chamber, between the opposing ends of the second wall.

* * * * *